United States Patent
Hu et al.

(10) Patent No.: US 8,126,455 B2
(45) Date of Patent: Feb. 28, 2012

(54) INFORMATION PROCESSING APPARATUS, PORTABLE TERMINAL APPARATUS, AND ROAMING INFORMATION PROCESSING METHOD THEREOF

(75) Inventors: Rongcai Hu, Tongzhou (CN); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 11/826,611

(22) Filed: Jul. 17, 2007

(65) Prior Publication Data
US 2007/0259646 A1 Nov. 8, 2007

Related U.S. Application Data

(63) Continuation of application No. PCT/JP2005/000482, filed on Jan. 17, 2005.

(51) Int. Cl.
H04W 4/00 (2009.01)
(52) U.S. Cl. ............... 455/432.1; 455/432.2; 455/432.3; 455/434; 455/435.1; 455/435.2; 455/435.3; 455/456.1; 455/456.3
(58) Field of Classification Search ............... 455/432.1, 455/432.2, 432.3, 433, 434, 435.1, 435.2, 455/435.3, 456.1, 456.3
See application file for complete search history.

(56) References Cited

U.S. PATENT DOCUMENTS

| | | | | |
|---|---|---|---|---|
| 5,586,338 | A * | 12/1996 | Lynch et al. | 455/433 |
| 5,610,919 | A * | 3/1997 | Willard et al. | 370/336 |
| 5,940,512 | A | 8/1999 | Tomoike | |
| 5,999,811 | A * | 12/1999 | Molne | 455/432.3 |
| 6,148,197 | A | 11/2000 | Bridges et al. | |
| 6,223,042 | B1 * | 4/2001 | Raffel | 455/455 |
| 6,246,875 | B1 * | 6/2001 | Seazholtz et al. | 455/432.1 |
| 7,047,008 | B2 * | 5/2006 | Martlew | 455/435.2 |
| 7,139,570 | B2 * | 11/2006 | Elkarat et al. | 455/432.3 |
| 7,274,917 | B2 * | 9/2007 | Almgren | 455/161.1 |
| 7,415,273 | B2 * | 8/2008 | Khawand | 455/434 |
| 2002/0123340 | A1 | 9/2002 | Park | |
| 2004/0029587 | A1 * | 2/2004 | Hulkkonen et al. | 455/436 |
| 2004/0157600 | A1 * | 8/2004 | Stumpert et al. | 455/432.1 |

(Continued)

FOREIGN PATENT DOCUMENTS

EP 1206154 A2 5/2002

(Continued)

OTHER PUBLICATIONS

Japanese Office Action for 2006-552821 dated Apr. 21, 2009.

(Continued)

Primary Examiner — Olumide T Ajibade Akonai
(74) Attorney, Agent, or Firm — Fujitsu Patent Center

(57) ABSTRACT

An information processing apparatus is included that is installed to an operator connected to a portable terminal apparatus by a communication line and is connected by a network to a plurality of operators selectable as a roaming destination of the portable terminal apparatus. The information processing apparatus includes a database that stores operator information, and an information distributing unit that, in response to receiving specification of an area of the roaming destination from the portable terminal apparatus, reads from the database operator information on an operator having a service area thereof in the specified area and distributes the read information to the portable terminal apparatus. The portable terminal apparatus includes a storing unit that stores the operator information and an information processing unit that receives the distribution of operator information on the operators having service areas thereof in a specified area by specifying the area of the roaming destination and registers the operator information in the storing unit.

7 Claims, 15 Drawing Sheets

U.S. PATENT DOCUMENTS

| | | | |
|---|---|---|---|
| 2005/0124338 A1* | 6/2005 | Benco et al. | 455/432.1 |
| 2005/0202812 A1 | 9/2005 | Minamida | |
| 2005/0239443 A1* | 10/2005 | Watanabe et al. | 455/414.1 |
| 2006/0194582 A1* | 8/2006 | Cooper | 455/436 |

FOREIGN PATENT DOCUMENTS

| | | |
|---|---|---|
| EP | 1482746 A2 | 12/2004 |
| GB | 2374766 A | 10/2002 |
| JP | 6-188830 A | 7/1994 |
| JP | 07030953 | 1/1995 |
| JP | 7-264666 A | 10/1995 |
| JP | 10013945 | 1/1998 |
| JP | 2002-125066 | 4/2002 |
| JP | 2002-125066 A | 4/2002 |
| JP | 2002-218522 A | 8/2002 |
| JP | 2002-236632 | 8/2002 |
| JP | 2002374556 A | 12/2002 |
| JP | 2003259457 A | 9/2003 |
| JP | 2004-519179 A | 6/2004 |
| JP | 2004-221861 | 8/2004 |
| JP | 2004-297187 | 10/2004 |
| JP | 2004357332 A | 12/2004 |
| WO | WO-99/01001 A1 | 1/1999 |
| WO | 2004060014 A2 | 7/2004 |

OTHER PUBLICATIONS

Chinese Office Action for Patent Application No. 200580046687.1, dated Oct. 23, 2009.
Decision of Refusal dated Dec. 8, 2009 issued in corresponding Japanese Patent application 2006-552821.
International Search Report (PCT/JP2005/000482) dtd Apr. 26, 2005.
Written Opinion of the ISA (PCT/JP2005/000482) dtd Apr. 26, 2005.
Korean Office Action issued in corresponding KR Patent Application No. 10-2007-7016060 dated Feb. 26, 2010.
Supplemental European Search Report, dated Feb. 4, 2011 for corresponding European Application No. 05703719.4.

* cited by examiner

| OPERATOR INFORMATION | | | | |
|---|---|---|---|---|
| OPERATOR | B | C | D | .... |
| CALLING CHARGE | .... | .... | .... | .... |
| SERVICE | EXCELLENT | ORDINARY | .... | .... |
| AREA RANGE | SMALL | LARGE | .... | .... |
| CALL QUALITY | EXCELLENT | ORDINARY | .... | .... |
| NUMBER OF SUBSCRIBERS | ORDINARY | MANY | .... | .... |
| CHARGING METHOD | .... | .... | .... | .... |
| AREA COVERING RATE | .... | .... | .... | .... |
| ............ | .... | .... | .... | .... |

INFORMATION PROCESSING APPARATUS, PORTABLE TERMINAL APPARATUS, AND ROAMING INFORMATION PROCESSING METHOD THEREOF

CROSS-REFERENCE TO RELATED APPLICATIONS

This application is a continuation of International Application No. PCT/JP2005/000482, filed on Jan. 17, 2005, now pending, herein incorporated by reference.

BACKGROUND OF THE INVENTION

1. Field of the Invention

The present invention relates to roaming of a portable terminal apparatus such as a portable telephone terminal, and to an information processing apparatus, a portable terminal apparatus, and a roaming information processing method thereof to obtain operator information from, for example, a mobile communication network (HPLMN: Home Public Land Mobile Network) and utilize the information for selecting an operator at a roaming destination.

2. Description of the Related Art

According to a conventional international roaming, when a portable terminal apparatus will have moved to the area of a roaming destination thereof, which operator will be available for communication is identified. It is not easy not only to select an operator but also to know whether roaming itself is possible depending on the destination before going abroad. When a plurality of operators are present at the roaming destination, obtaining information such as the contents of services thereof, etc., is indispensable in selecting an operator.

Methods of obtaining information such as a network operator, from a base station accessible from a portable terminal apparatus, include a method of setting priority of operators such as an operator that provided the last service, and an operator to which a user subscribed, an operator selected according to priority stored in a storing medium, an operator selected based on a received electric intensity (for example, Japanese Patent Application Laid-Open Publication No. 2002-218522). Similarly, for a portable terminal apparatus having a communicating function, a method has been proposed of notifying a user of communication conditions that minimize the cost for a communication route by collecting information on roaming connection in a foreign country from the provider to which a user subscribes (Japanese Patent Application Laid-Open Publication No. 2002-125066). A search scheme has been proposed of registering selection priority of a plurality of wireless communication systems to be used in a portable terminal apparatus and a wireless communication system to be used is selected according to the selection priority (Japanese Patent Application Laid-Open Publication No. 06-188830).

It is troublesome to grasp the contents of services of each operator such as charges and the area covering rates and to select an operator even if the operators at a roaming destination can be identified before moving. When the area covering rate and the quality of calls are lowered by selecting an operator, selecting the operator has no meaning though the calling charge can be minimized. The criteria for selecting an operator differ by user and are diverse. According to a scheme (Japanese Patent Application Laid-Open Publication No. 06-188830) of registering a communication network in advance into a portable terminal apparatus and selecting from the communication network an operator to be used according to priority, operators to be used are limited to those that are registered.

It is very beneficial to expand obtainable operator information before roaming and select a desired operator from the obtained operator information. However, none of Japanese Patent Application Laid-Open Publication No. 2002-218522, Japanese Patent Application Laid-Open Publication No. 2002-125066 and Japanese Patent Application Laid-Open Publication No. 06-188830 discloses such a task and includes suggestion about the solution of such a task. Though Japanese Patent Application Laid-Open Publication No. 06-188830 describes that the registered information is searched in advance, Japanese Patent Application Laid-Open Publication No. 06-188830 has no disclosure and no suggestion about collection of operator information to be registered.

SUMMARY OF THE INVENTION

The present invention relates to roaming of a portable terminal apparatus such as a portable telephone terminal and an object thereof is to facilitate the convenience of selecting an operator by obtaining information on operators before moving to the area of the roaming destination.

Another object of the present invention is to automatically enable communication with an operator selected in advance when a portable terminal apparatus has moved to the area of the roaming destination.

Yet another object of the present invention is to expand the convenience of selecting an operator by obtaining operator information in an area when a portable terminal apparatus has moved to the area of the roaming destination.

To achieve the above objects, an information processing apparatus of the present invention is an information processing apparatus that is installed to an operator connected to a portable terminal apparatus by a communication line and is connected by a network to a plurality of operators selectable as roaming destinations of the portable terminal apparatus, and is configured to include a database that stores operator information obtained from the network, and an information distributing unit that, in response to receiving specification of the area of the roaming destination from the portable terminal apparatus, reads from the database operator information on the operator having a service area thereof in a specified area and distributes the read information to the portable terminal apparatus.

In the information processing apparatus, the database captures and stores operator information obtained from operators through the network. In this case, the operator information includes a list of operators to be selected as a roaming destination, contents of services, etc., and the contents of the services are the calling charge, the area covering rate, etc. An area of a roaming destination selected from the portable terminal apparatus is a region throughout which the service areas of a plurality of networks are deployed such as a country, a district, etc.

When specification of an area of a roaming destination is received from the portable terminal apparatus, the operator information of operators having the service areas thereof in the specified area is read from the database and the operator information to the portable terminal apparatus is distributed. The user of the portable terminal apparatus refers to the distributed operator information, compares the operators among themselves and, thereby, can select the optimal operator as the roaming destination.

To achieve the above objects, in the information processing apparatus of the present invention, the information distributing unit may be configured to receive specification of an operator made by the portable terminal apparatus and notify the specified operator of information on the user. According to this configuration, when specification of the operator is received from the portable terminal apparatus, the information of the user is provided to the specified operator through the information distributing unit. Thereby, when the portable terminal apparatus has moved to the roaming destination, the portable terminal apparatus can establish communication with the specified operator.

To achieve the above objects, in the information processing apparatus of the present invention, the operator information may be configured to include a list of operators about operators present in the area of the roaming destination and the contents of services of each operator.

To achieve the above objects, the information processing apparatus of the present invention may be configured to, in case where the information distributing unit receives a user authentication request from the operator at the roaming destination of the portable terminal apparatus, if the portable terminal apparatus does not have the operator information about the operator at the roaming destination, cause the information distributing unit to distribute the operator information to the portable terminal apparatus. According to this configuration, when the portable terminal apparatus having moved to the roaming destination does not store the operator information, the portable terminal apparatus can obtain the operator information from the operator at the roaming destination. Based on this operator information, the user can also select the optimal operator at the roaming destination.

To achieve the above objects, the portable terminal apparatus of the present invention is a portable terminal apparatus that is connected to an operator through a communication line and is connected to an operator at a roaming destination through a communication line, and is configured to include a storing unit that stores operator information on the operator and an information processing unit that receives distribution of operator information on an operator having a service area thereof in a specified area by specifying the area of the roaming destination to the operator, and registers the operator information in the storing unit. According to the configuration, the portable terminal apparatus can execute a process corresponding to the above information processing in the information processing apparatus. That is, the storing unit stores the operator information provided from the information processing apparatus. By specifying the area of the roaming destination to the operator, the portable terminal apparatus receives distribution of the operator information on the operator having a service area in the specified area from the operator. The operator information is registered in the storing unit and is used to select an operator.

To achieve the above objects, the portable terminal apparatus may be configured to cause the information processing unit to generate a selective output of the operator of the roaming destination. According to the configuration, the selective output of the operator at the roaming destination can be generated, for example, being correlated with the operator information.

To achieve the above objects, the storing unit of the portable terminal apparatus of the present invention may be configured by a recording medium detachable from a housing unit of the portable terminal apparatus. That is, the operator information may be stored in an internal storing element of the portable terminal apparatus or may be configured to be recorded in the recoding medium detachable from the housing unit. When the operator information is recorded in the recording medium detachable from the housing unit, the operator information can be used for another portable terminal apparatus using the recording medium.

To achieve the above objects, the portable terminal apparatus of the present invention may be configured to, in case that the information processing unit does not have the operator information on the operator of the roaming destination, cause the information processing unit to obtain the operator information from the operator at the roaming destination.

To achieve the above objects, a roaming information processing method of an information processing apparatus of the present invention is a roaming information processing method of an information processing apparatus that is installed to an operator connected to a portable terminal apparatus by a communication line and is connected by a network to a plurality of operators selectable as roaming destinations of the portable terminal apparatus, and is configured to comprise the steps of capturing operator information on an operator of a roaming destination of the portable terminal apparatus, accepting specification of an area of the roaming destination specified by the portable terminal apparatus, and distributing to the portable terminal apparatus the operator information on an operator having a service area thereof in the specified area of the roaming destination.

According to the configuration, the operator information is information on an operator that is likely to be selected as the roaming destination of the portable terminal apparatus and the information may be obtained from an operator of the roaming destination, etc., through the network. When the information processing apparatus receives the specification of an area of the roaming destination from the portable terminal apparatus, the information processing apparatus accepts the specification of the area, an operator having a service area in the specified area is selected, and the operator information on the operator is distributed to the portable terminal apparatus.

To achieve the above objects, the roaming information processing method of the information processing apparatus of the present invention may be configured to further include the steps of receiving specification of an operator selected by the portable terminal apparatus and notifying the specified operator of user information of the portable terminal apparatus. In this case, the information processing apparatus that have received the specification of the operator from the portable terminal apparatus notifies the operator of the roaming destination that the user desires, of the user information. Thereby, the user can communicate using the operator of the roaming destination.

To achieve the above objects, the roaming information processing method of the information processing apparatus of the present invention may be configured to further include the step of producing an operator list showing operators having service areas thereof in each area and operator information including the contents of services classified to be comparable with each other by service for each operator. By this information processing, for the operator information presented to the user, the contents of services are presented being classified. Therefore, the user can easily select the operator that the user desires.

To achieve the above objects, the roaming information processing method of the information processing apparatus of the present invention may be configured to further, include the step of, in case where the portable terminal apparatus receives a user authentication request from the operator of the roaming destination, if the operator information of the roaming destination is not present in the portable terminal apparatus, distributing the operator information to the portable terminal apparatus that is a target of the user authentication request. According to the configuration, the portable terminal apparatus can receive the distribution of the operator information at the roaming destination and can utilize the operator information in selecting the optimal operator.

To achieve the above objects, the roaming information processing method of the portable terminal apparatus of the present invention is a roaming information processing method of a portable terminal apparatus that is connected through a communication line in a service area of an operator and is connected to an operator of a roaming destination by a communication line, and is configured to include the steps of specifying an area of the roaming destination to the operator, receiving from the operator distribution of operator information on operators having service areas thereof in a specified area of the roaming destination, and registering the operator information distributed.

According to this configuration, the portable terminal apparatus specifies the area of the roaming destination to the operator and the operator information is registered into the portable terminal apparatus that has received the operator information on the operators having service areas in the specified area from the operator due to the specification of the area. The user can utilize the operator information in selecting an operator at the roaming destination.

To achieve the above objects, the roaming information processing method of the portable terminal apparatus of the present invention may be configured to further include the steps of judging whether the operator information on an operator of the roaming destination is present and, in case that the operator information is not present, obtaining the operator information at the roaming destination from the operator. Due to this processing, the portable terminal apparatus can obtain the operator information at the roaming destination and can utilize the operator information in selecting a new operator.

The features and advantages of the present invention are as follows.

(1) The portable terminal apparatus can obtain the operator information of the roaming destination before moving to an area of the roaming destination and can utilize the operator information in selecting an operator.

(2) When the portable terminal apparatus has moved to the area of the roaming destination, the portable terminal apparatus can communicate with an operator selected in advance. Therefore, the labor such as operator setting is unnecessary.

(3) The portable terminal apparatus can obtain the operator information at the roaming destination and can utilize the operator information in selecting an operator. Therefore, the portable terminal apparatus can select the optimal operator.

Other objects, features, and advantages of the present invention will be more clear by referencing the accompanying drawings and embodiments.

BRIEF DESCRIPTION OF THE DRAWINGS

FIG. 2 is a diagram of operator information in an operator information database.

DETAILED DESCRIPTION OF THE PREFERRED EMBODIMENTS

Figure 1:
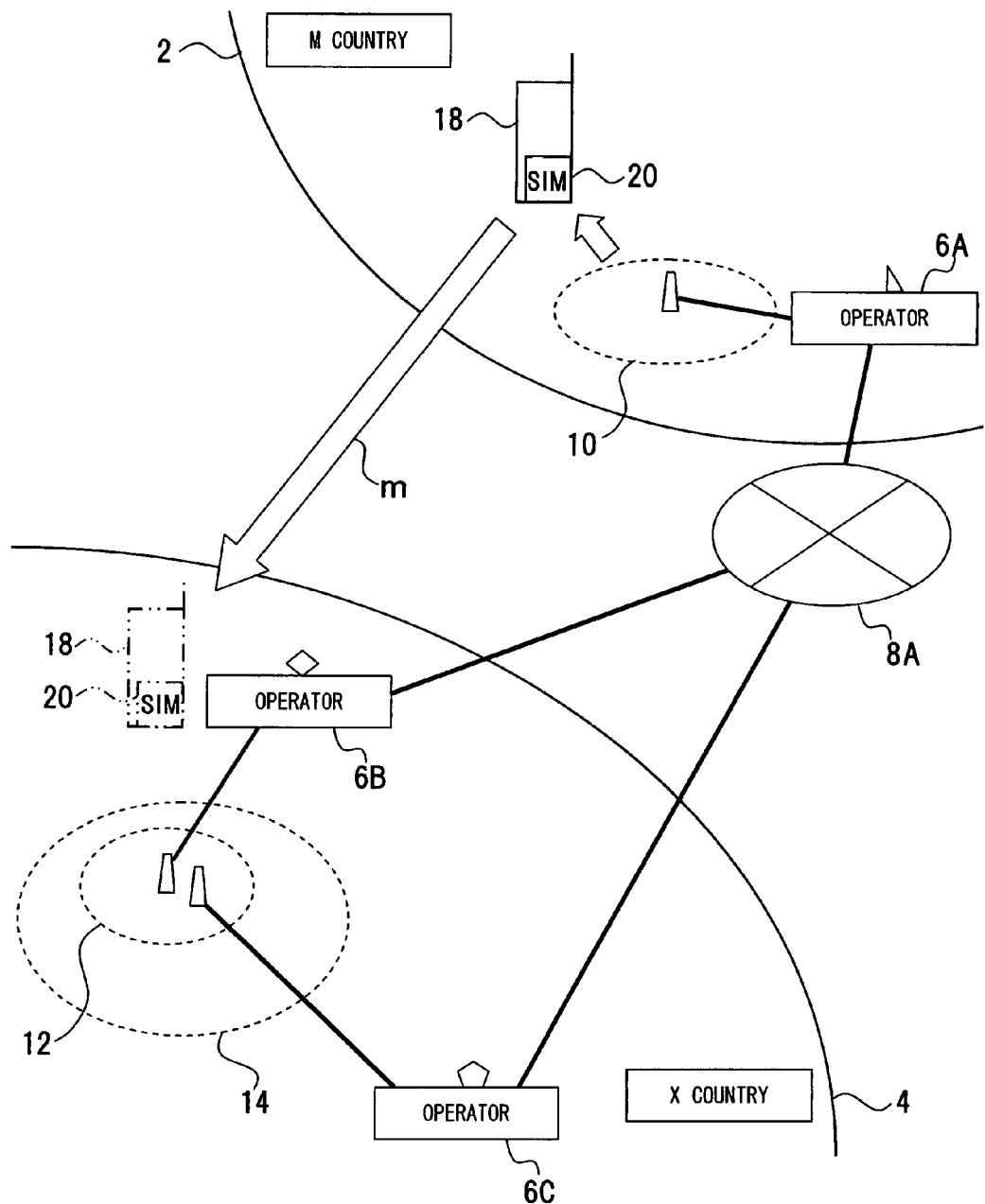
FIG. 1 is a diagram of the overview of a roaming system.

Description will be given for a roaming system according to the present invention referring to FIG. 1. FIG. 1 shows the overview of the roaming system.

A plurality of areas that enables reception of a roaming service include, for example, M Country 2 and X Country 4. In M Country 2, for example, an operator 6A as the operator that a user subscribes to is present. In X County 4, for example, operators 6B and 6C as the operators that are affiliates for roaming are present. Each of the operators 6B and 6C configures an independent mobile communication network (HPLMN) and a network that enables transmission and reception of information by each of the operators 6B and 6C is configured. The operator 6A has a core network 8A and is connected respectively to operators 6B and 6C. That is, the operators 6A, and 6B and 6C can transmit and receive information to/from each other by communication across areas. Though countries are exemplified as units of the roaming service in the embodiment, a unit may be an area that is wider than a country and may also be an area that is smaller than a country.

The operator 6A has a service area 10 in M Country 2 and provides various services using telephone communication as a medium thereof such as a communication service and the roaming service. The operator 6B has a service area 12 in X Country 4 and also provides various services using telephone communication as a medium thereof such as a communication service and the roaming service. The operator 6C has a service area 14 also in X Country 4 and also provides various services using telephone communication as a medium thereof such as a communication service and the roaming service.

In this roaming service system, for example, in the core network 8A, for example, the operators 6B and 6C are present that each are selectable as an operator for a roaming partner of each country. For example, various pieces of information such as various services, the area range, the area covering rate, the call quality, the number of subscribers, the calling charge, the charging method, etc., are captured as operator information provided from operators 6B and 6C. Operator information B as information on the operator 6B and operator information C as information on the operator 6C are registered in a database (DB, for example, an operator information database DB 38A). In this database, for example, as shown in FIG. 2, the pieces of operator information B, C, D, . . . respectively concerning the operators 6B, 6C, . . . that are the affiliates are registered and, for example, country codes and PLMN (Public Land Mobile Network) codes are registered as identifying information of the operators 6B, 6C, . . . A PLMN code is an identification number of a mobile-communication-dedicated network aiming at providing mobile land communication services.

The pieces of operator information B and C are provided to a portable terminal apparatus 18 that is an information processing apparatus based on a request of a user that carries the apparatus 18 with him/her. The portable terminal apparatus 18 stores these pieces of operator information B and C, and the form of the storage thereof is such that the information is registered in a storing unit in the portable terminal apparatus 18 or in a recording medium, for example, a SIM card 20 that is detachable from the portable terminal apparatus 18.

The storing unit or the SIM (Subscriber Identity Module) card in the portable terminal apparatus 18 also stores and retains trigger information such as a PLMN code directory that distinguishes clearly that the portable terminal apparatus has entered X Country 4.

According to the configuration, a user present in M Country 2 requests operators present in X Country 4 that is the roaming destination and operator information thereof to the core network 8A through the operator 6A using the portable terminal apparatus 18 to leave for X Country 4 (an arrow m). The core network 8A having received the request transmits the operators 6B and 6C that are the affiliates of the network 8A and the pieces of operator information B and C on the operators 6B and 6C (FIG. 2) to the portable terminal apparatus 18. As a result, the user knows the operators 6B and 6C at the roaming destination and obtains the pieces of operator information B and C.

The user refers to the pieces of operator information B, C, . . . and selects an operator at the roaming destination. Assuming that the operator 6B is selected, the user causes the storing unit or the SIM card 20 of the portable terminal apparatus 18 to store the operator information B and to store simultaneously the trigger information such as the PLMN code to supplement an electromagnetic wave from the operator 6B. In this case, so-called operator setting to receive services of the operator 6B is made.

When the portable terminal apparatus 18 has entered X Country 4 and enters the coverage of the service area 12 of the operator 6B, the portable terminal apparatus 18 can receive the trigger information transmitted from the operator 6B. Comparison to the information stored before entering the country is executed and the information is automatically changed to the operator 6B having been set. As a result, The user can immediately receive provision of the services of the operator 6B without needing any operation after entering X Country 4. The process to receive the roaming service in X Country 4 is unnecessary and simplification of international roaming can be facilitated.

Figure 3:
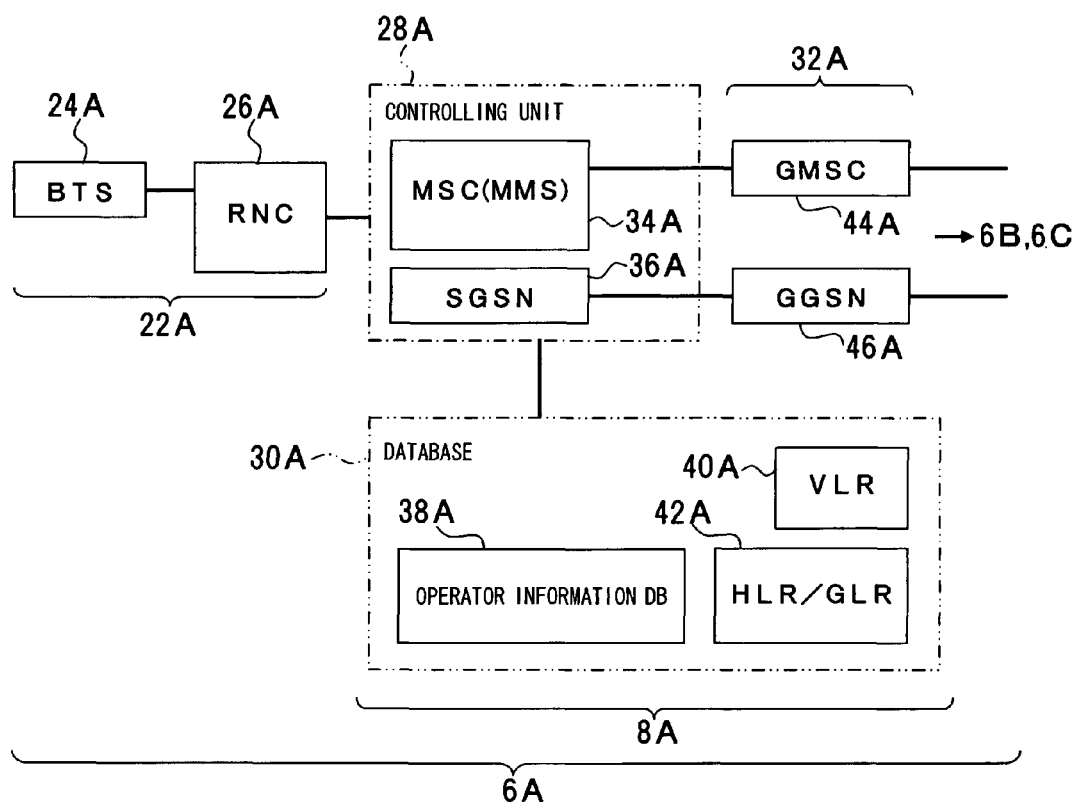
FIG. 3 is a block diagram of an example of an operator.
Figure 4:
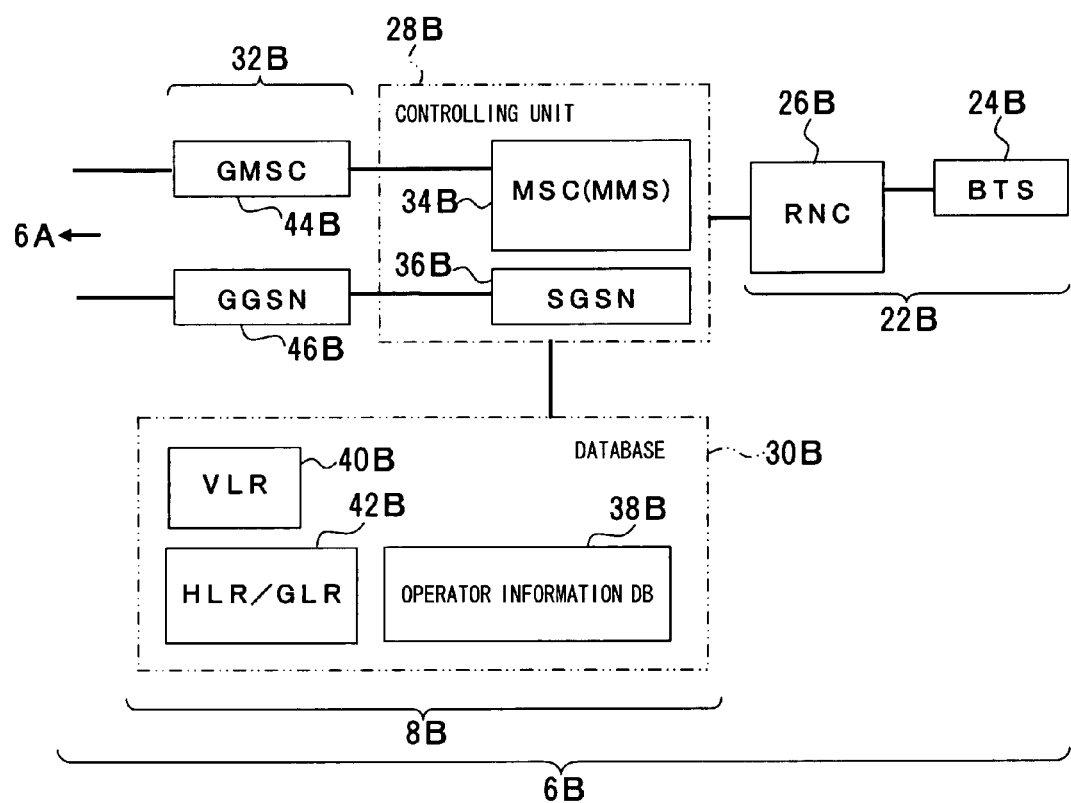
FIG. 4 is a block diagram of another example of an operator.

Description will be given for the operators referring to FIGS. 3 and 4. FIG. 3 is a block diagram of an example of the operator 6A. FIG. 4 is a block diagram of an example of the operator 6B.

The operator 6A: is an information processing apparatus that executes various types of information processing such as transmission and reception of information with the portable terminal apparatus 18, and accumulation and reading of information for a database 30A; and has the main configuration including a RAN (Radio Access Network) 22A and the above core network 8A. The RAN 22A includes a BTS (Base Station Transceiver Station) 24A, an RNC (Radio Network Controller) 26A, etc. The RAN 22A configures mainly a transmission path of data. The core network 8A is configured by a controlling unit (Control Part) 28A, a database 30A, a gateway 32A, etc. The controlling unit 28A constitutes an information distributing unit that distributes various types of information such as the operator information read from the database 30A.

The controlling unit 28A is configured by an MSC (MMS) (Mobile Switching Center, Mobile Multimedia Switching System) 34A, an SGSN (Serving GPRS Support Node) 36A as a GPRS (General Packet Radio Service) user switching, etc. The SGSN 36A is a node that executes position administration of GPRS users, security management, access control, etc.

The database 30A includes an operator information database (DB) 38A, a VLR (Visitor Location Register) 40A, an HLR (Home Location Register)/GLR (Gateway Location Register) 42A constituting a user information database, etc. The operator information DB 38A stores the operator information that is already a roaming affiliate and stores the above pieces of operator information B and C, etc., (FIG. 2). The VLR 40A is a database that stores the user information duplicated from a network of the carrier that the user subscribes to when the roaming is started. The HLR/GLR (user information DB) 42A constitutes a database of position information, the telephone number, etc., of the user.

The gateway 32A includes a GMSC (Gateway Mobile Switching Center) 44A that is a gateway of a mobile communication switching center, and a GGSN (Gateway GPRS Support Node) 46A as a gateway connecting the above GPRS and other networks. The MSC 34A controls a line switching network and the SGSN 36A controls a packet network. The MSC 34A or the SGSN 36A of the controlling unit 28A is connected to other core networks of the operators 6B and 6C, etc., through the GMSC 44A or the GGSN 46A.

According to the configuration, the controlling unit 28A accesses the database 30A when necessary and obtains information from the operator information DB 38A, the VLR 40A, and the HLR/GLR 42A. The VLR 40A stores information of a user that has roamed in. The HLR/GLR 42A stores user information of a user that subscribes to the operator 6A, for example, a user U.

The operator 6B is an information processing apparatus that executes various types of information processing such as transmission and reception of information with the portable terminal apparatus 18, accumulation and reading of information for the database 30B, has the main configuration that is for example, configured as shown in FIG. 4, and has the same configuration as that of the operator 6A in the embodiment. That is, the operator 6B has the main configuration including a RAN 22B and a core network 8B. The RAN 22B includes a BTS 24B, an RNC 26B, etc. The core network 8B is configured by a controlling unit 28B, a database 30B, a gateway 32B, etc. The controlling unit 28B is configured by an MSC (MMS) 34B, an SGSN 36B, etc. The database 30B includes an operator information DB 38B, a VLR 40B, an HLR/GLR 42B, etc. The gateway 32B includes a GMSC 44B and a GGSN 46B. According to the configuration, the operator 6B has the same functions as those of the operator 6A.

Figure 5:
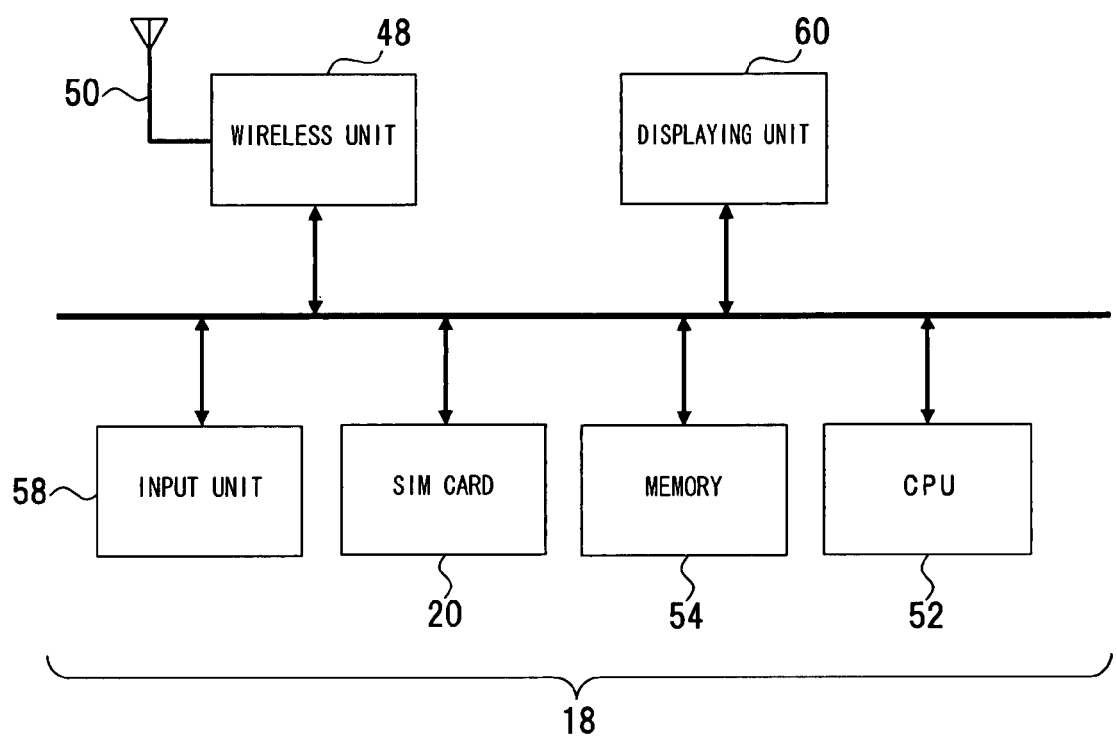
FIG. 5 is a block diagram of the hardware of a portable terminal apparatus.
Figure 6:
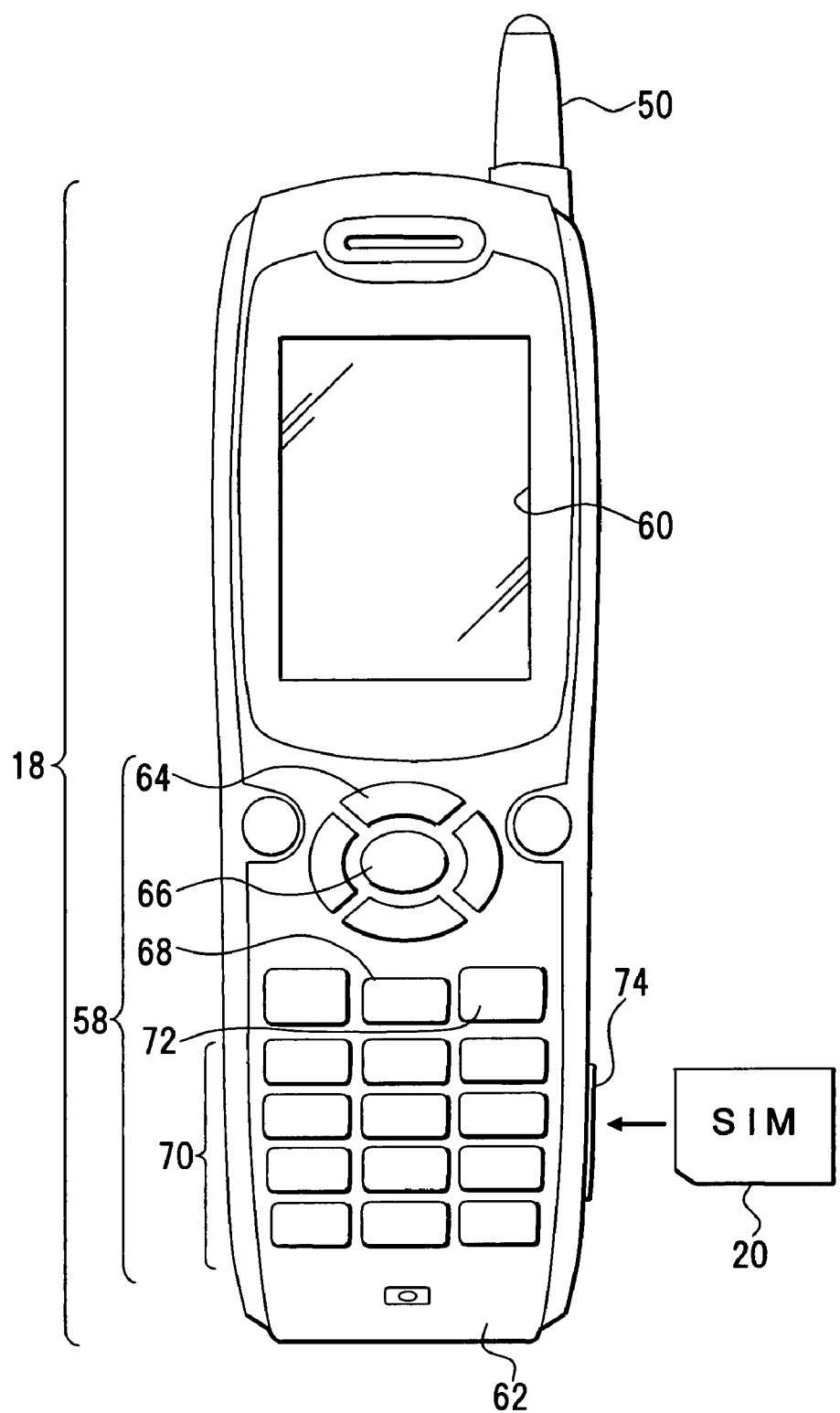
FIG. 6 is a diagram of an exemplary configuration of the appearance of the portable terminal apparatus.

Description will be given for the portable terminal apparatus referring to FIGS. 5 and 6. FIG. 5 is a block diagram of the hardware of the portable terminal apparatus. FIG. 6 is a diagram of an exemplary configuration of the appearance of the portable terminal apparatus.

The portable terminal apparatus 18 is configured by a portable telephone, a portable personal computer, a PDA (Portable Digital Assistant), etc., and constitutes a portable telephone as an example in the embodiment. In the portable terminal apparatus 18, a wireless unit 48 executes communication by a wireless telephone line with, for example, the operator 6A in M Country 2, the operators 6B and 6C in X Country 4, etc., through an antenna 50. The wireless unit 48 includes a modulating unit that modulates sound signals and various data signals that are transmitted and received, and a base band unit that demodulates high-frequency signals. A CPU (Central Processing Unit) 52 as an information processing unit executes telephone communication control and information processing by running control programs. In this case, a memory 54 and the SIM card 20 are incorporated as a storing unit. The memory 54 stores a control program for roaming processing, other programs, various types of data, etc. The SIM card 20 is a recording medium detachable from the portable terminal apparatus 18 and stores various types of information such as the above pieces of operator information B and C necessary for the roaming, etc. An input unit 58 is constituted of a plurality of keys. A displaying unit 60 is a display that displays information and is constituted of, for example, an LCD (Liquid Crystal Display).

The portable terminal apparatus 18 includes, for example, as shown in FIG. 6, a housing unit 62 and the housing unit 62 includes the antenna 50, the input unit 58, the displaying unit 60, etc. The input unit 58 incorporates cursor keys 64, a determination key 66, a release key 68, ten keys 70, a power key 72, etc. The cursor keys 64 are used for varying the position of a cursor displayed on the displaying unit 60, etc. The determination key 66 is used to determine selection set by the cursor. The release key 68 is used for releasing operations of various inputs and ending operations of programs. The ten keys 70 are used to input telephone numbers and input characters. The power key 72 is used to turn on the power, end functions, turn off the power, etc.

A recording medium attaching slot 74 is formed on a side of the housing unit 62 and, for example, a SIM card 20 is attached as a recording medium into the recording medium attaching slot 74. In stead of the SIM card 20, a USIM (Universal Subscriber Identity Module) card may be used. As above, when the SIM card 20, etc., are used, a data retaining unit is configured in addition to the above memory 54 (FIG. 5).

Figure 7:
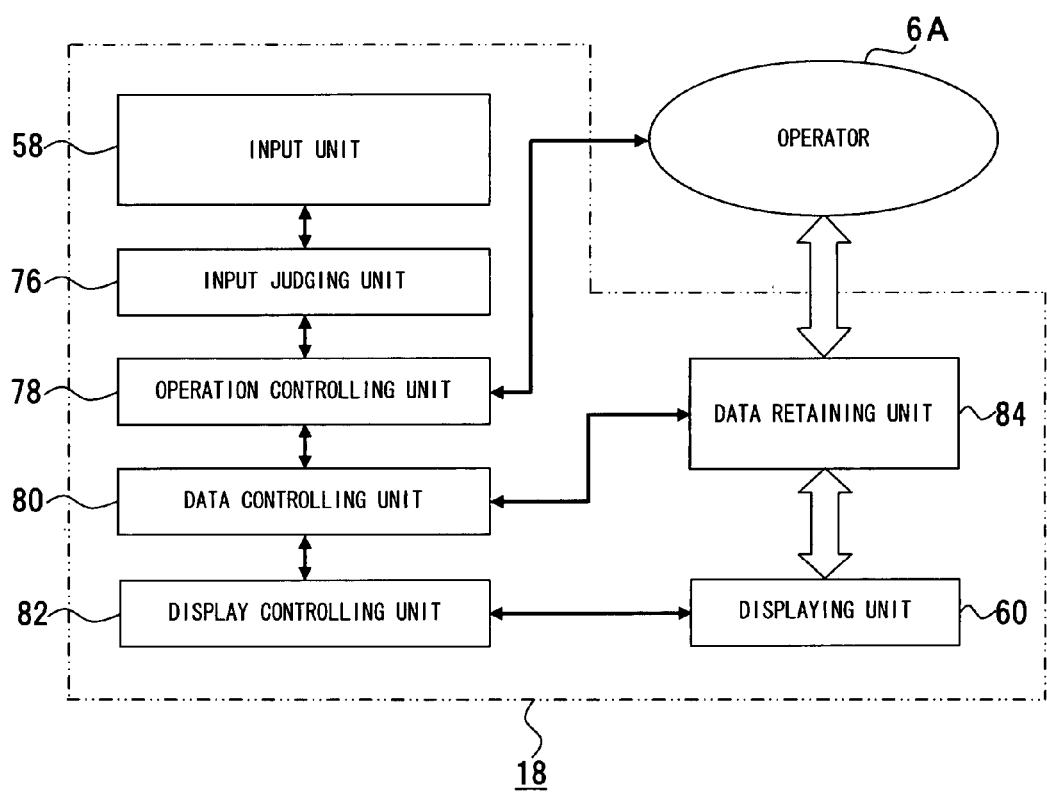
FIG. 7 is a diagram of operations of the portable terminal apparatus and transmission and reception of information thereof with an operator.

Description will be given for the operational configuration of the portable terminal apparatus referring to FIG. 7. FIG. 7 is a diagram of operations of the portable terminal apparatus and the configuration for transmission and reception of information thereof with an operator. That is, according to the configuration, obtaining of information from the operator 6A and an information retaining operation of the portable terminal apparatus 18 are executed.

In the portable terminal apparatus 18, an input judging unit 76, an operation controlling unit 78, a data controlling unit 80, and a display controlling unit 82 are configured by execution by the CPU 52 of the program stored in the above memory 54. A data retaining unit 84 that is a storing unit is configured by the memory 54, etc. When the SIM card 20 or the USIM card is attached, the data retaining unit 84 is configured including the SIM card 20 or the USIM card.

As above, the input unit 58 is configured by the cursor key 64, the determination key 66, the power key 72, etc., and the turning on and operations thereof are judged by the input judging unit 76 and the judgment result is added to the operation controlling unit 78. The operation controlling unit 78 monitors inputs from the input unit 58 and the operation of the portable terminal apparatus 18 and, when the operation controlling unit 78 receives an input from the input unit 58, the operation controlling unit 78 executes communication control due to the reception of the input as a trigger. The portable terminal apparatus 18 executes communication with the operator 6A through the operation controlling unit 78. The data controlling unit 80 causes the data retaining unit 84 to store various types of data that the operation controlling unit 78 handles. The data retaining unit 84 also stores the pieces of operator information B, C, etc., provided from the operator 6A.

The display controlling unit 82 causes the displaying unit 60 to display thereon data to be displayed from the data controlling unit 80. The data stored in or read from the data retaining unit 84 is displayed on the displaying unit 60.

Figure 8A:
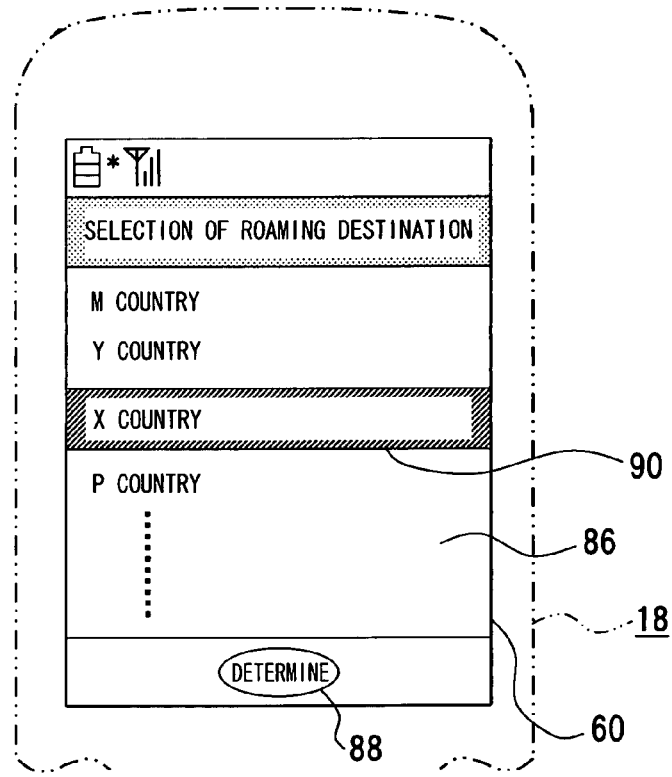
FIGS. 8A and 8B are diagrams of an example of a screen for selecting a roaming destination and a screen displaying the operator information.
Figure 8B:
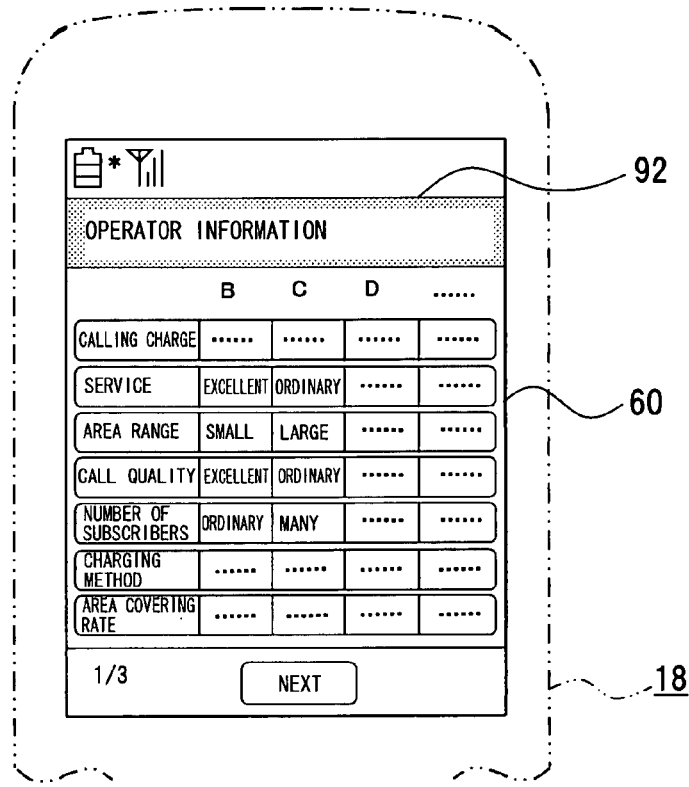
Figure 9A:
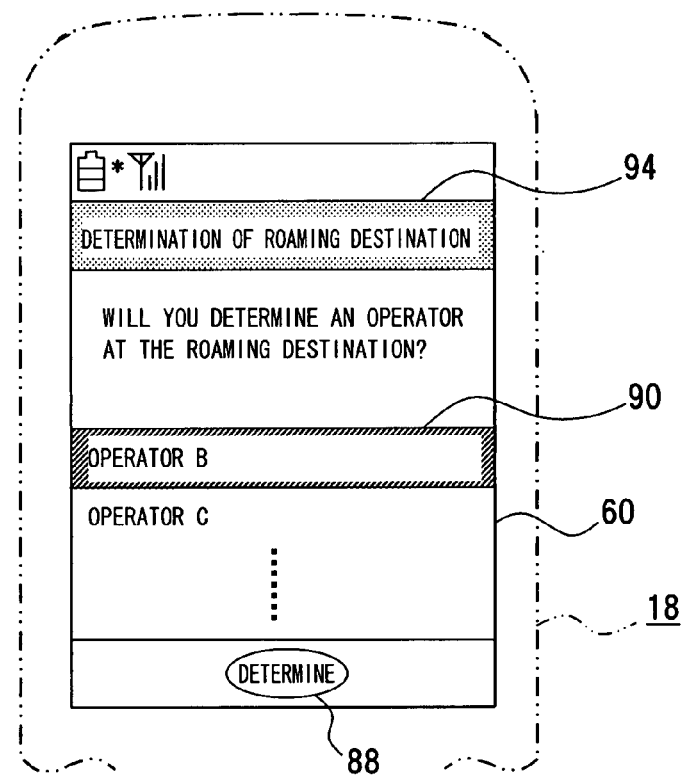
FIGS. 9A and 9B are diagrams of an example of a determination screen for a roaming destination and a display screen for registration.
Figure 9B:
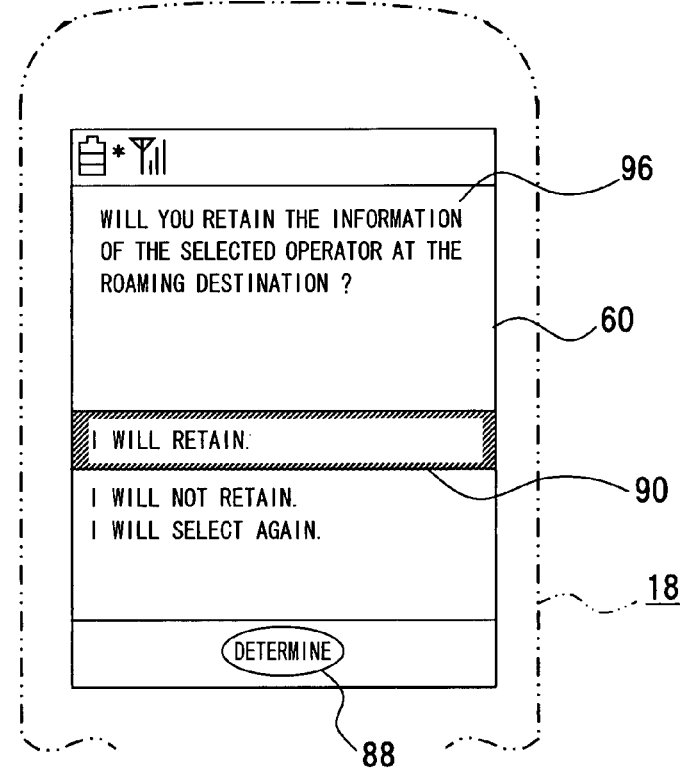

Description will be given for the display contents of the portable terminal apparatus referring to FIGS. 8A to 9B. FIGS. 8A and 8B are diagrams of an example of a screen for selecting a roaming destination and a screen displaying the operator information. FIGS. 9A and 9B are diagrams of an example of a determination screen for a roaming destination and a display screen for registration.

In the portable terminal apparatus 18, when a roaming function is started up, as shown in FIG. 8A, a roaming destination selection screen 86 is deployed on the displaying unit 60 and the roaming destination selection screen 86 displays "Selection of Roaming Destination", "M Country", "Y Country", "X Country", "P Country", etc., and also displays a "Determined" mark 88 and a cursor 90. When the cursor 90 is superimposed on "X Country" and the determination key 66 (FIG. 6) is pressed down in the roaming destination selection screen 86, X Country 4 (FIG. 1) is selected as a selected country.

When the portable terminal apparatus 18 requests operator information of X Country 4 that is the roaming destination to the operator 6A, the operator 6A transmits the operator information to the portable terminal apparatus 18 and, as shown in FIG. 8B, the operator information (FIG. 2) is deployed on the displaying unit 60. An operator information displaying screen 92 displays thereon "Operator Information", "B, C, D, . . . ", "Calling Charge", "Services", "Area Range", "Call Quality", "Number of Subscribers", "Charging Method", "Area Covering Rate" and, as evaluation of the contents of these items, "Excellent", "Ordinary", "Small", "Large", "Many", etc. When a plurality of pages are necessary, for example, "⅓" is displayed as the current page number to the total page number and "NEXT", etc., are displayed for advancing to the next page. Referring to these pieces of operation information, the user U can select an operator at the roaming destination.

After referring to these pieces of operator information, when the user U advances to a determining operation of a roaming destination, a roaming destination determination screen 94 is deployed as shown in FIG. 9A. The roaming destination determining screen 94 displays "Determination of Roaming Destination", "Will you determine an operator at the roaming destination?", "Operator B", "Operator C", etc., and also a cursor 90. When the cursor 90 is superimposed on, for example, "Operator B" and the determination key 66 (FIG. 6) is pressed down in the roaming destination determination screen 94, the operator 6B is selected.

When the operator 6B is determined as the operator at the roaming destination and this determination information is transmitted from the portable terminal apparatus 18 to the operator 6A, the user advances to a retaining process of the operator information at the roaming destination and, as shown in FIG. 9B, an operator information retention screen 96 for the operator of the roaming destination is deployed. The operator information retention screen 96 displays a message of "Will you retain the information of the selected operator at the roaming destination?" and also displays "I will retain.", "I will not retain.", "I will select again.", and a cursor 90. When the cursor 90 is superimposed on, for example, "I will retain." and the determination key 66 (FIG. 6) is pressed down in the operator information retention screen 96, for example, the operator information B is retained. In this case, when the SIM card 20 is attached, the SIM card 20 stores the operator information.

Figure 10:
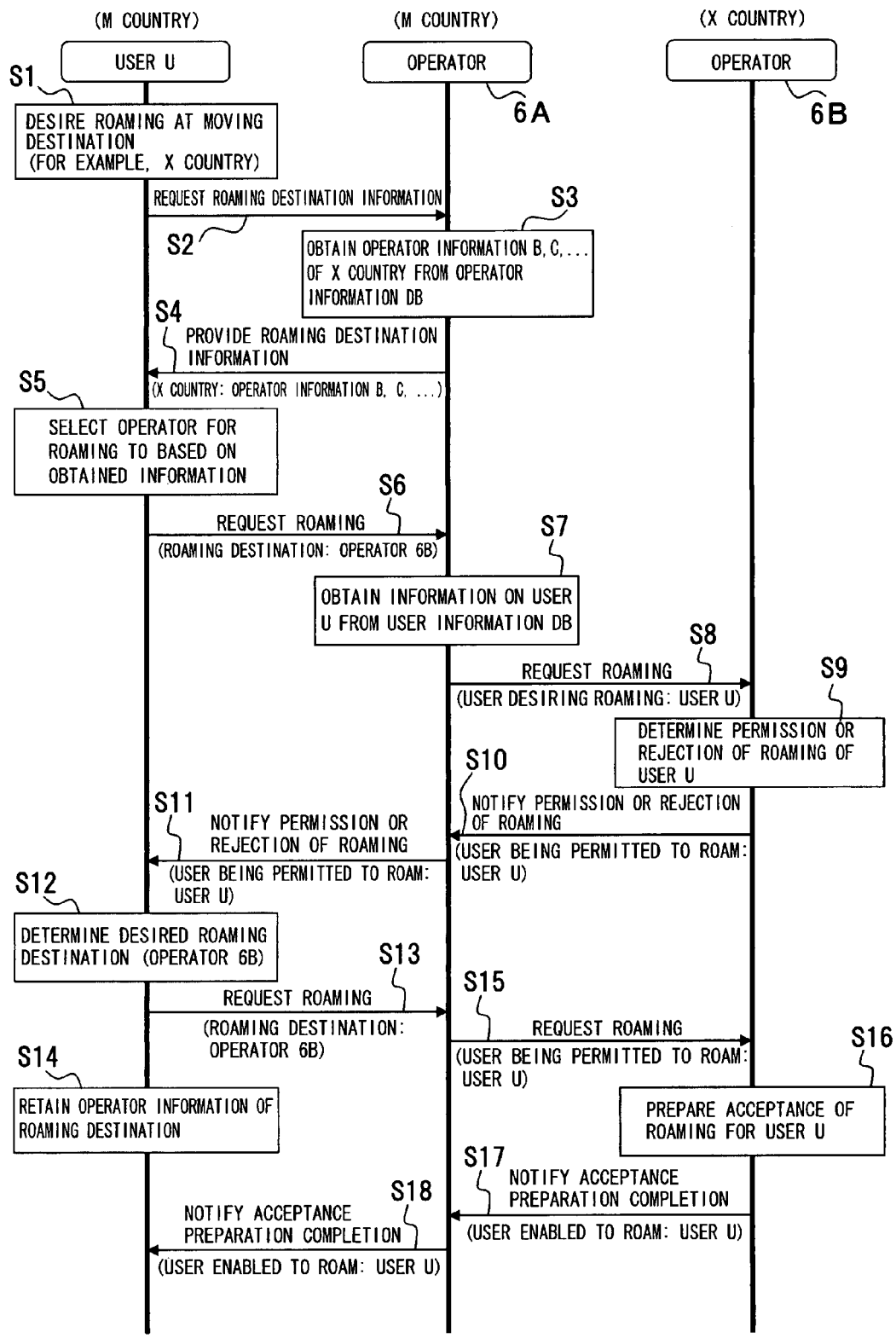
FIG. 10 is a flowchart of a process procedure of a roaming destination determining method or a roaming destination determination process program.

Description will be given for a roaming method referring to FIG. 10. FIG. 10 is a flowchart of a process procedure of a roaming destination determining method or a roaming destination determination process program.

This process assumes the case where the user U that subscribes to the operator 6A in M Country 2 for the portable terminal apparatus 18 moves from M Country 2 to X Country 4 and uses the portable terminal apparatus 18 with, for example, the telephone number currently being used in X Country 4 that is the destination of the moving. It is also assumed that the operators 6B and 6C (FIG. 1) and other operators 6D, . . . are present in X Country 4. In this case, information concerning the operator 6D is operator information D.

The user U desires a roaming service in X Country 4 before moving and selects a roaming destination (for example, X Country 4) using the portable terminal apparatus 18 (step S1) and requests operator information of the roaming destination (X Country 4) to the operator 6A (step S2). That is, this operator information is information concerning operators with whom the operator 6A has entered roaming contracts in X Country 4.

Having been requested distribution of the operator information, the operator 6A obtains the pieces of operator information B, C, D, . . . registered in the operator information DB 38A (FIG. 3) (step S3) and transmits the pieces of operator information B, C, D, . . . to the portable terminal apparatus 18 of the user U (step S4).

The displaying unit 60 (FIG. 6) of the portable terminal apparatus 18 displays the pieces of operator information B, C, D, . . . transmitted to the portable terminal apparatus 18. The user U refers to the pieces of operator information B, C, D, . . . , etc., and selects any one of the operators 6B, 6C, 6D, etc., displayed on the displaying unit 60 (step S5). For example, the operator 6B is selected by bringing the cursor 90 to "Operator B" of "Operators B, C, D, . . . " displayed on the displaying unit 60 and pressing down the determination key 66. Based on this selection, the portable terminal apparatus 18 transmits a roaming request of the operator 6B to the operator 6A (step S6).

Having received the roaming request, the operator 6A obtains information of the user U from the user information DB (HLR/GLR 42) (step S7) and notifies the operator 6B in X Country 4 of the roaming request of the user U together with the user information (step S8). The operator 6B determines permission or rejection of the roaming for the user U based on the user information transmitted from the operator 6A (step S9). Information on the permission or the rejection is notified of to the operator 6A (step S10) and is notified of from the operator 6A having received this notification to the portable terminal apparatus 18 of the user U (step S11). The user U makes a final decision as to whether the operator 6B is determined to be the roaming destination based on the information on the permission or the rejection (step S12). When the user U determines the operator 6B to be the roaming destination, a request to the effect as above is notified to the operator 6A (step S13). At this time, the portable terminal apparatus 18 stores the operator information of the roaming destination (step S14). This operator information includes various pieces of information such as the information of the permission or the rejection of the roaming, in addition to the above operator information B.

The operator 6A receives the request from the user U and requests the preparation of the roaming of the user U to the operator 6B (step S15). The operator 6B executes acceptance preparation for the user U (step S16) and, when the acceptance preparation is completed, transmits a notification of the completion of the preparation to the operator 6A (step S17). The notification is notified of from the operator 6A to the portable terminal apparatus 18 of the user U (step S18). The notification is displayed on the displaying unit 60 of the portable terminal apparatus 18. The user U recognizes the completion of the acceptance preparation of the roaming of the operator 6B.

Due to the above process, the user U can set the operator 6B of the roaming destination to the portable terminal apparatus 18 in M Country 2 before moving. The operator 6B completes the acceptance preparation of the roaming service for the user U that has been requested before moving of the user U.

Figure 11:
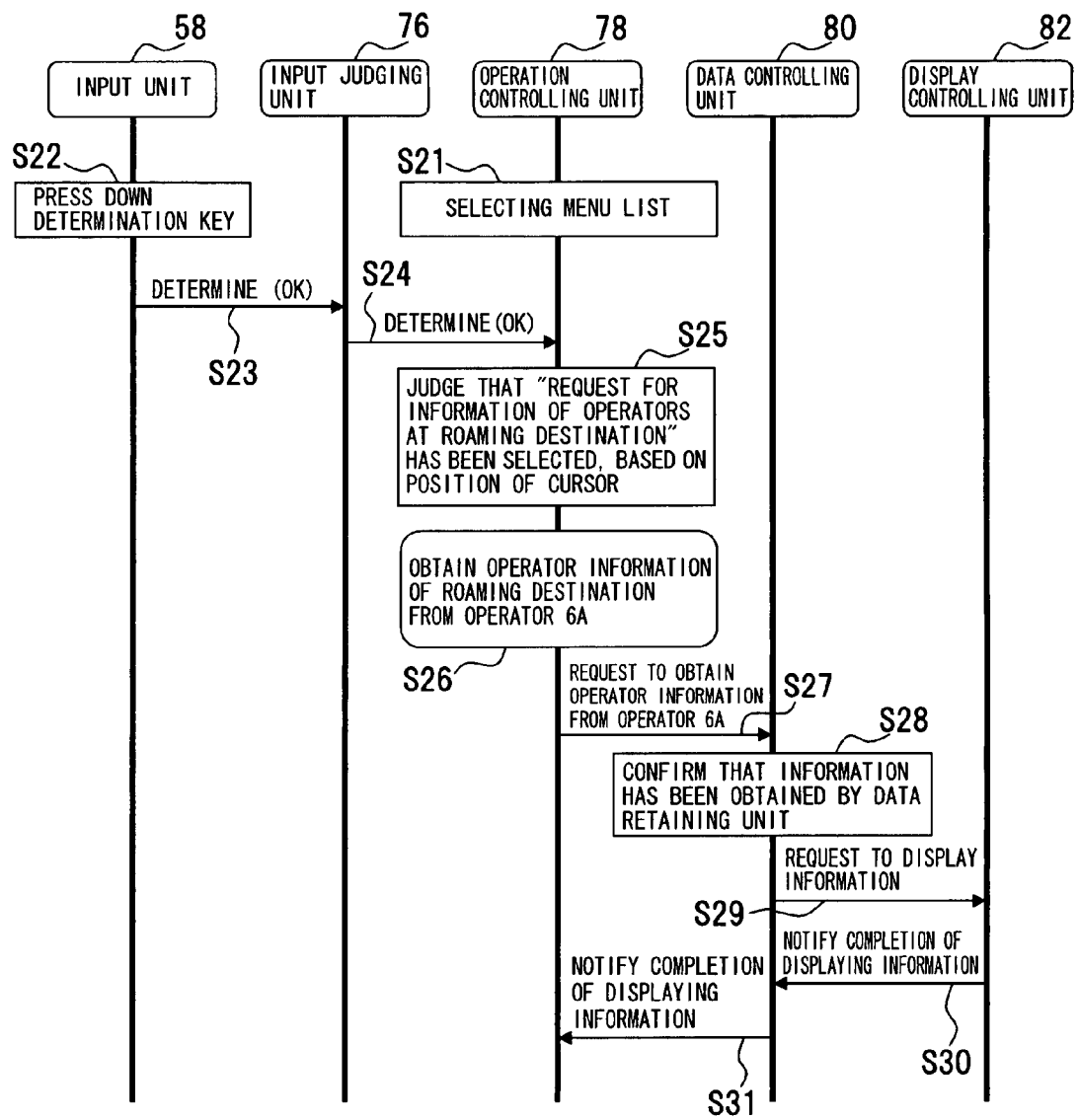
FIG. 11 is a flowchart of a process procedure of an in-apparatus process of the portable terminal apparatus from determining a roaming destination to obtaining information.

Description will be given for the roaming method referring to FIG. 11. FIG. 11 is a flowchart of a process procedure of an in-apparatus process of the portable terminal apparatus from determining a roaming destination to obtaining information.

When a roaming function is selected from an initial menu, the displaying unit 60 of the portable terminal apparatus 18 enters a display mode during the selection of a menu list (step S21). The user U can move the cursor 90 to the menu list. The operation controlling unit 78 monitors the position of the cursor 90 and a menu selected is judged according to the position. It is assumed that the cursor 90 is brought to "Request for Information of Operators at the Roaming Destination" from the menu list and the determination key 66 is pressed down (step S22). As a result, "Request for Information of Operators at the Roaming Destination" is selected. At this time, by pressing down the determination key 66, a determination input is added to the input judging unit 76 (step S23). Having received the determination input, the input judging unit 76 executes detection and analysis thereof and notifies the operation controlling unit 78 of the fact that the determination input has been generated (step S24). In response to receiving this determination input, the operation controlling unit 78 judges that "Request for Information of Operators at the Roaming Destination" has been selected based on the position of the cursor (step S25) and shifts the mode thereof to an obtaining mode of the operator information of the roaming destination from the operator 6A (step S26).

The operation controlling unit 78 issues to the data controlling unit 80 an information obtaining request to the operator 6A (step S27). In response to receiving this request, the data controlling unit 80 requests the operator information to the operator 6A, retains in the data retaining unit 84 the operator information obtained from the operator 6A, and confirms that the operator information is retained in the data retaining unit 84 (step S28). The data controlling unit 80 requests to the display controlling unit 82 to display on the displaying unit 60 the operator information present in the data retaining unit 84 (step S29). Caused by the display controlling unit 82, the displaying unit 60 displays the operator information read from the data retaining unit 84 and a completion notice of the data display is issued to the data controlling unit 80 (step S30) and, similarly, the completion notice of the data display is issued from the data controlling unit 80 to the operation controlling unit 78 (step S31).

Figure 12:
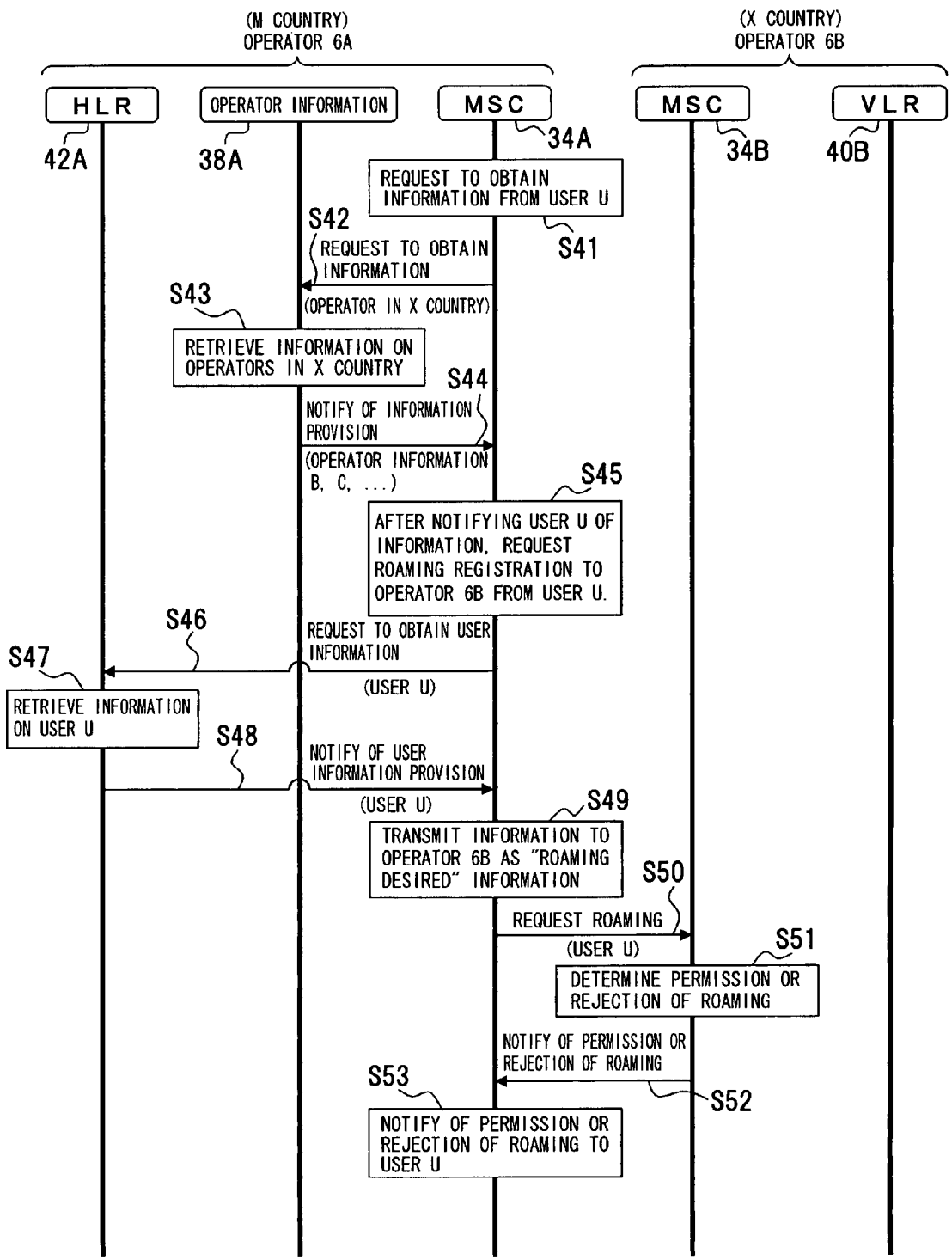
FIG. 12 is a flowchart of a process procedure of information processing between operators.
Figure 13:
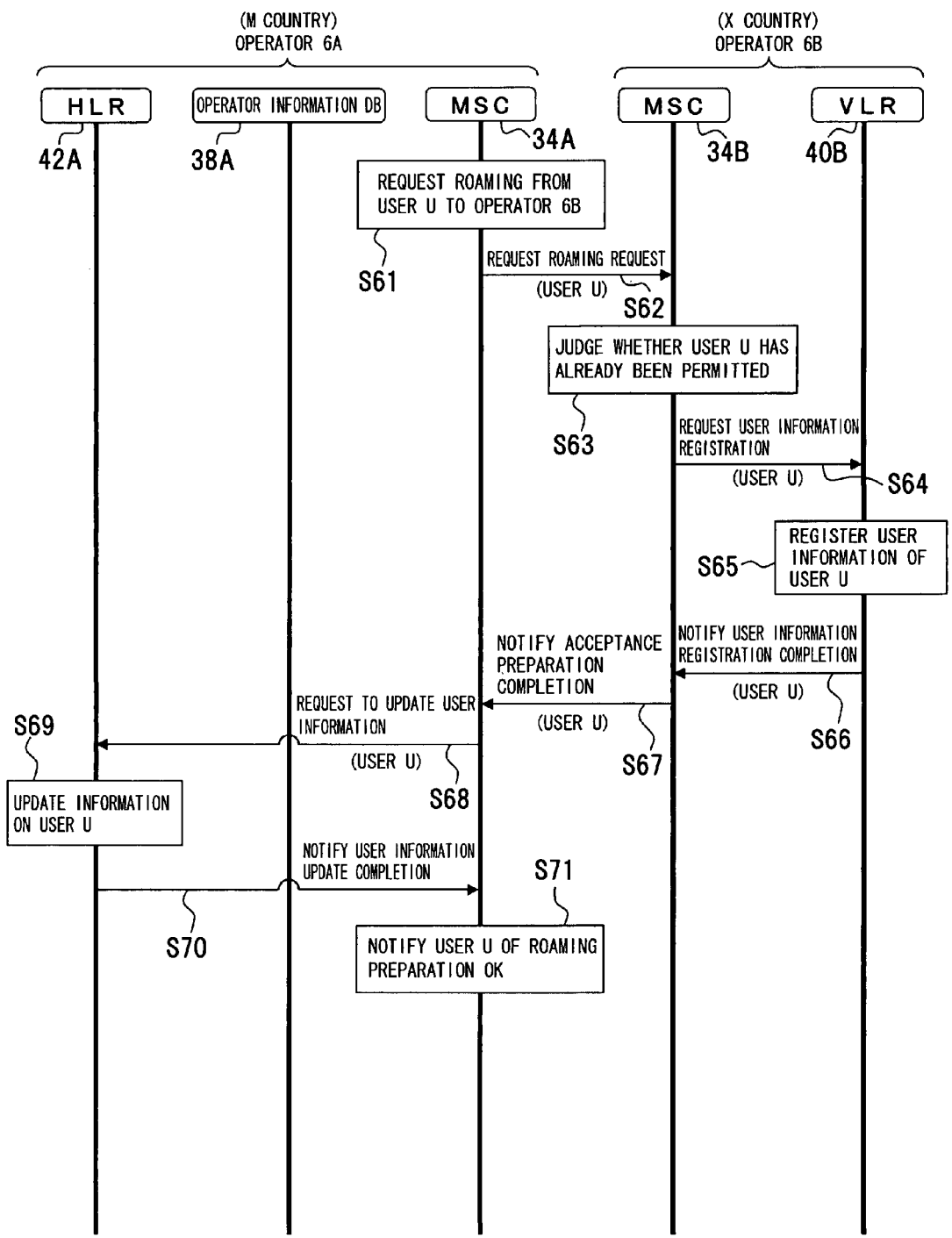
FIG. 13 is a flowchart of a process procedure of information processing between operators.

Description will be given for the roaming method referring to FIGS. 12 and 13. FIGS. 12 and 13 are flowcharts of process procedures of the operator 6A.

This process represents a process of the operator 6A that has received the roaming request from the portable terminal apparatus 18 and a process of the operator 6B corresponding thereto.

Using the MSC 34A that is a mobile switching center, the operator 6A recognizes that the operator 6A has received an information request to a roaming destination, for example, X Country 4 from the user U (step S41). The MSC 34A requests to the operator information DB 38A information on the operators 6B, 6C, etc., that are the roaming affiliates in X Country 4 (step S42). The operator information DB 38A retrieves the information concerning the operators 6B, 6C, etc., in the X Country 4 (step S43) and notifies the MSC 34A of the pieces of operator information B, C, . . . (step S44).

In this case, the pieces of the operator information B, C, . . . are notified of from the MSC 34A to the portable terminal apparatus 18 of the user U. After the notification, the MSC 34A receives from the user U a request to register the operator 6B for the roaming thereof and executes a requesting process of the registration for the roaming to the operator 6B (step S45). With this process, the MSC 34A requests the HLR 42A to obtain information on the user U (step S46). The HLR 42A retrieves the information of the user U (step S47) and notifies the MSC 34A of the user information on the user U (step S48).

The MSC 34A executes a process of notifying the MSC 34B (FIG. 4) of the operator 6B in X Country 4 of the user information as "roaming desiring" information of the user U (step S49) and issues a roaming request (step S50). The MSC 34B of the operator 6B having received the roaming request judges whether the MSC 34B permits the roaming based on the information of the user U that has been provided, determines the permission or rejection (step S51), and notifies the MSC 34A of the operator 6A of the permission or the rejection of the roaming (step S52). The MSC 34A notifies the portable terminal apparatus 18 of the user U of a roaming permission or rejection notice from the MSC 34B of the operator 6B (step S53).

When the portable terminal apparatus 18 of the user U has issued the roaming request to the operator 6B (step S61), the MSC 34A of the operator 6A issues the roaming request to the MSC 34B of the operator 6B (step S62). The MSC 34B judges whether the MSC 34B has already permitted the roaming to the user U (step S63). When the MSC 34B has permitted the roaming, the MSC 34B issues a registration request of the user information of the user U to the VLR 40B (step S64), registers the user information (step S65), and notifies the MSC 34B of a registration completion notice (step S66). After completing the registration, the MSC 34B notifies the MSC 34A of the operator 6A that the acceptance preparation has been completed (step S67). Having received the acceptance preparation completion notice, the MSC 34A of the operator 6A requests the HLR 42A to update the information of the user U (step S68). The HLR 42A updates the information of the user U (step S69) and, when the updating is completed, notifies the MSC 34A of the completion notice (step S70). Having received the completion notice of the information updating, the MSC 34A notifies the portable terminal apparatus 18 of the user U that the acceptance preparation has been completed (step S71).

Figure 14:
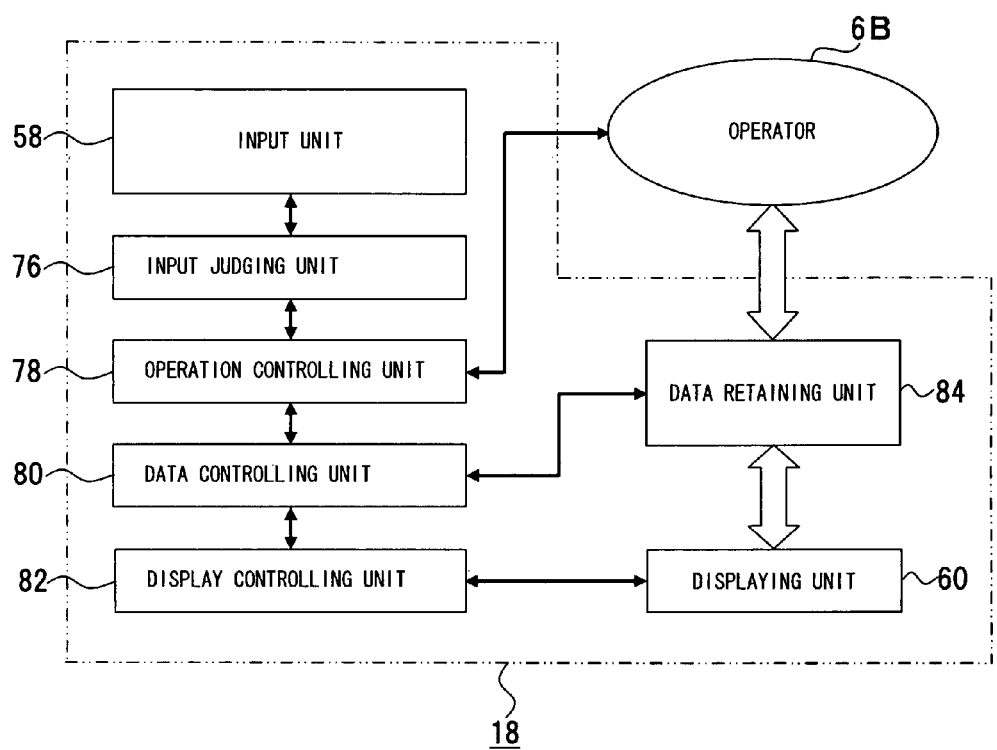
FIG. 14 is a diagram of operations of the portable terminal apparatus and transmission and reception of information with an operator.
Figure 15:
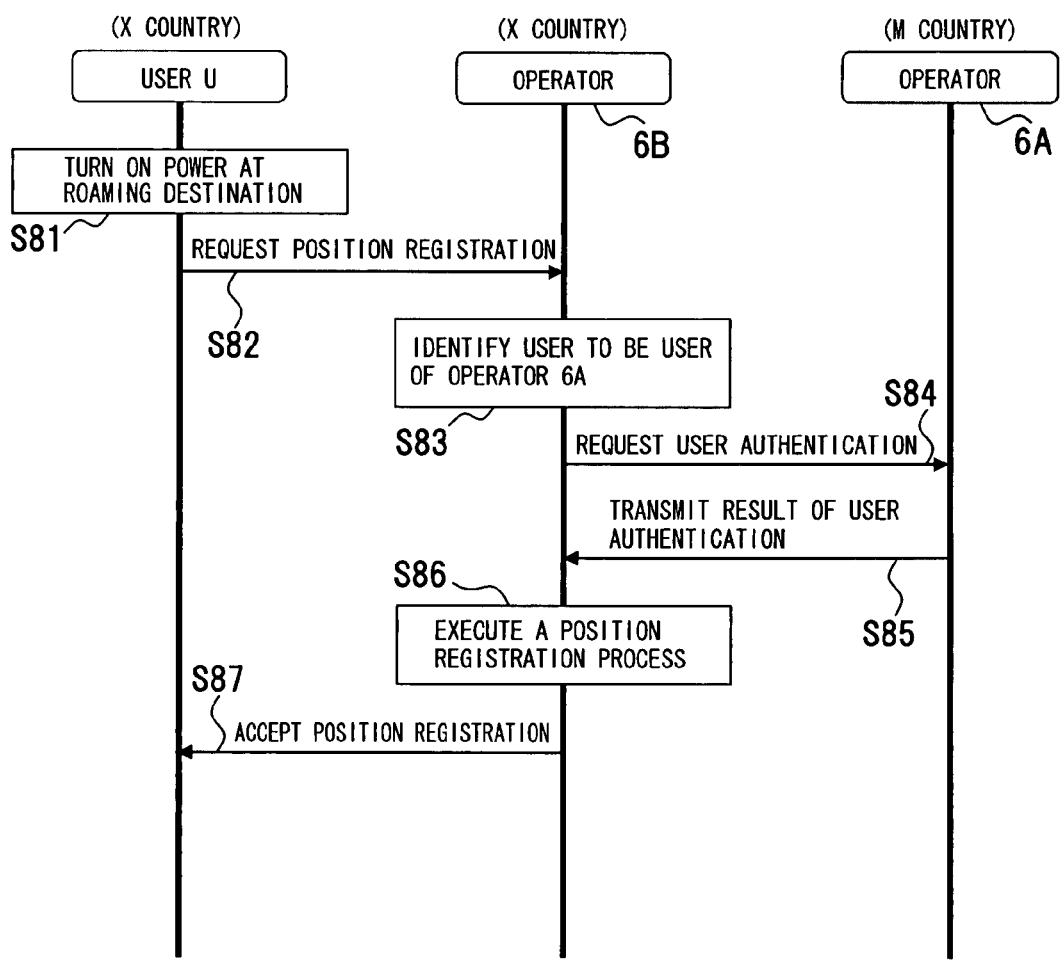
FIG. 15 is a flowchart of a process procedure of a position registering process of a roaming destination.

Description will be given for the roaming method referring to FIGS. 14 and 15. FIG. 14 is a block diagram of communication and transmission and reception of data between the portable terminal apparatus and an operator of the roaming destination. FIG. 15 is a flowchart of a process procedure of a position registration of a roaming destination.

When the user U enters X Country 4 and presses down the power key 72 (FIG. 6) of the input unit 58 of the portable terminal apparatus 18, the state of the portable terminal apparatus 18 is shifted to an operating state and the portable terminal apparatus 18 notifies the operator 6B of a position registration request using the wireless unit 48 (FIG. 5) through the operation controlling unit 78. The operator 6B executes a registering process for the portable terminal apparatus 18 of the user U. In this registering process, processes such as user authentication and acceptance of the position registration are executed and, simultaneously, the operator 6B provides an acceptance notice and various pieces of information. The data is retained in the data retaining unit 84 and is displayed on the displaying unit 60.

This registering process is a process of the position registration executed when the user U enters X Country 4 carrying the portable terminal apparatus 18 and, as shown in FIG. 15, when the power key 72 of the portable terminal apparatus 18 is pressed down (is turned on) (step S81), the portable terminal apparatus 18 issues a position registration request to the operator 6B (step S82). This position registration request includes the operator information from the user U and the operator 6B identifies that the portable terminal apparatus 18 of the user U is a subscriber to the operator 6A (step S83). The operator 6B requests to the operator 6A authentication of the fact that the user U is a subscriber of the operator 6A (step S84). The operator 6A notifies the operator 6B of the authentication result (step S85). The operator 6B executes the position registering process of the user U as a process in response to the authentication result (step S86). Having accepted the position registration, the operator 6B executes notification of the position registration acceptance completion to the portable terminal apparatus 18 of the user U (step S87).

When the user U has completed the above processes, the user U can use the portable terminal apparatus 18 for telephone communication, various types of information, etc., in the service area 12 of the operator 6B in X Country 4 similarly to M Country 2. The conventional search for a roaming destination is unnecessary and the user can start using the portable terminal apparatus in X Country 4 as soon as the user turns on the portable terminal apparatus. Therefore, the convenience of roaming can be improved.

For the above embodiment, features, advantages, and modifications thereof will be listed and described.

(1) The operator information provided from an operator includes various types of information such as the area covering rate, the calling quality in addition to the calling charge and, therefore, various types of information necessary for selecting an operator can be referred to.

(2) The network provides the operator information including various types of information such as the operator list and the contents of services thereof in response to the request from the portable terminal apparatus 18, and the operator information can be utilized in selecting an operator by storing the operator information in the SIM card, the USIM card, the internal storing device of the portable terminal apparatus, etc.

(3) Because an operator can be selected after obtaining the operator information of the roaming destination from the network, the user does not need to collect the network information at the destination of the move thereof. Therefore, simplification of the international roaming can be facilitated and the convenience thereof can be improved.

(4) The user can obtain the operator information and re-select an operator after moving to the roaming destination. Therefore, roaming with an operator that satisfies the demands of the user can be realized.

(5) Because collection of the operator information is enabled by affiliating the portable terminal apparatus with the network, the operator information can be obtained in real time. Because the operator information can be freely obtained, the optimal operator can be selected and the roaming is enabled.

(6) The technique according to the present invention collects the operator information on operators in the area of the roaming destination by utilizing the network to register the operator information, compared to the technique described in the above Japanese Patent Application Laid-Open Publication No. 06-188830 that, after registering in advance, searches according to the registered information. Therefore, the operator information, that is, the reference information of the user to be registered in the portable terminal apparatus becomes abundant and optimization of the operator selection can be facilitated.

(7) When the portable terminal apparatus is registered in the network at the roaming destination, according to the call-receiving process sequence with the mobile communication network (HPLMN), more suitable operator information and network information can be obtained from the HPLMN and the operator selection is enabled.

The method of the present invention may be configured to, for example, in the case where the operator 6A in M Country 2 receives the user authentication request from the operator 6B in X Country 4 that is the roaming destination of the portable terminal apparatus 18, when the portable terminal apparatus 18 does not have any operator information on any operator of the roaming destination, for example, the operator 6B in X Country 4, cause the operator 6B in X Country 4 to distribute the operator information to the portable terminal apparatus 18 at the roaming destination. In this case, the operator information is distributed from the controlling unit 28B as an information distributing unit to the portable terminal apparatus 18 at the roaming destination. According to the configuration, when the operator information is not stored in the portable terminal apparatus 18 that has moved to the roaming destination, the user can obtain the operator information from the operator 6B of the roaming destination and the user can select the optimal operator 6B, 6C, etc., at the roaming destination based on the obtained operator information.

(8) The above process in the operators 6A and 6B may be configured to include a process to create, for example, the operator information DB 38A as shown in FIG. 2 including the operator list showing operators having service areas in each area and the operator information including the contents of services classified to be comparable with each other by service for each operator. In this case, according to the information processing, for the operator information provided to the user, the contents of the services are classified and provided to the operator information DB 38A. Therefore, the user can easily select a desired operator. This processing may be executed by the portable terminal apparatus 18 and the operator information may be classified to be comparable by service for each operator.

(9) Because the operator information of the roaming destination is obtained on the network, presence of no operator information can not exist and dissatisfaction from the operator selection due to limited information can be cleared.

(10) Though the portable terminal apparatus 18 is exemplified in the above embodiment, the present invention can be applied to various types of apparatuses that each have a communication function communicable with a network such as a portable telephone, a PDA, a personal computer having a communication function, and a digital camera having a communication function, and is not limited to the embodiment.

(11) Though the internal storing apparatus of the portable terminal apparatus 18 and the external storing apparatus such as the SIM card 20, etc., are exemplified in the embodiment as a recording medium that stores various types of information such as the operator information, the same effects as those of the above embodiment can be expected when a recording medium other than the above. Therefore, the recording media are not limited to those exemplified in the embodiment.

Though the most preferred embodiment, etc., of the present invention have been described as above, the present invention is not limited to the above description. Various modifications and changes can surely be made to the present invention by those skilled in the art based on the purview of the present invention described in the claims or disclosed herein and such modifications and changes are surely encompassed in the scope of the present invention.

The present invention relates to roaming of a portable terminal apparatus such as a portable telephone terminal and, for example: can determine a roaming destination by obtaining operator information from a mobile communication network (HPLMN) before moving; enables roaming registration without any complicated processes at a moving destination; can select a roaming destination by capturing the operator information from an operator at the moving destination; and, therefore, can contribute to easier international roaming and higher communication quality thereof.

What is claimed is:

1. A portable terminal apparatus that is connected to an operator through a communication line and is connected to an operator at a roaming destination through a communication line, comprising:
   a storing unit that stores operator information on the operator; and
   an information processing unit that requests operator information to a connected operator with specifying an area of the roaming destination, receives, from the connected operator, operator information on an operator having a service area thereof in the specified area, the operator information including any one of contents of a service provided using telephone communication as a medium, an area range, an area covering rate, the number of subscribers, a calling charge and a charging method, and registers the operator information in the storing unit,
   wherein before the portable terminal apparatus moves to the specified area, the information processing unit receives the operator information, selects an operator at the roaming destination from the operators having service areas thereof in the specified area, registers, along with trigger information, operator information on the operator at the roaming destination in the storing unit, the trigger information distinguishing a radio wave coming from the operator, and makes setting to receive services of the operator at the roaming destination, and
   after the portable terminal apparatus moves to the specified area, the information processing unit receives trigger information from the operator at the roaming destination, compares the trigger information registered in the storing unit to the trigger information received from the operator at the roaming destination, and changes an operator to the operator at the roaming destination.

2. The portable terminal apparatus of claim 1, wherein the information processing unit generates a selective output of the operator of the roaming destination.

3. The portable terminal apparatus of claim 1, wherein the storing unit is configured by a recording medium detachable from a housing unit of the portable terminal apparatus.

4. The portable terminal apparatus of claim 1, wherein
in case that the information processing unit does not have the operator information about the operator of the roaming destination, the information processing unit obtains the operator information from the operator at the roaming destination.

5. A roaming information processing method of a portable terminal apparatus that is connected through a communication line in a service area of an operator and is connected to an operator of a roaming destination by a communication line, comprising:

requesting operator information to a connected operator with specifying a specified area of the roaming destination before moving to the specified area;

receiving, from the connected operator, operator information on an operator having a service area thereof in the specified area, the operator information including any one of contents of a service provided using telephone communication as a medium, an area range, an area covering rate, the number of subscribers, a calling charge and a charging method; and selecting an operator at a roaming destination from the operators having service areas thereof in the specified area, registering, along with trigger information, operator information on the operator at the roaming destination, the trigger information distinguishing a radio wave coming from the operator, and making setting to receive services of the operator at the roaming destination, and after moving to the specified area, receiving trigger information from the operator at the roaming destination, comparing the registered trigger information to the trigger information received from the operator at the roaming destination, and changes an operator to the operator at the roaming destination.

6. The roaming information processing method of the portable terminal apparatus of claim 5, further comprising:

judging whether operator information on the operator of the roaming destination is present; and in case that the operator information is not present, obtaining the operator information at the roaming destination from the operator.

7. A roaming information processing method of an information processing apparatus that is installed to an operator connected to a portable terminal apparatus by a communication line and is connected by a network to a plurality of operators selectable as roaming destinations of the portable terminal apparatus, comprising:

capturing operator information on an operator at a roaming destination of the portable terminal apparatus;

accepting specification of a specified area of the roaming destination specified by the portable terminal apparatus before the portable terminal apparatus moves to the specified area; and transmitting to the portable terminal apparatus the operator information on an operator having a service area thereof in the specified area of the roaming destination before the portable terminal apparatus moves to the specified area, wherein the portable terminal apparatus selects an operator at the roaming destination, stores, along with trigger information, operator information on the operator at the roaming destination, the trigger information distinguishing a radio wave coming from the operator, and makes setting to receive services of the operator at the roaming destination, and after moving to the specified area, the portable terminal apparatus receives trigger information from the operator at the roaming destination, compares the stored trigger information to the trigger information received from the operator at the roaming destination, and changes an operator to the operator at the roaming destination.

* * * * *